US012782621B2

(12) United States Patent
Houck

(10) Patent No.: US 12,782,621 B2
(45) Date of Patent: Nov. 3, 2026

(54) OPTICAL FILTER

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 1040 days.

(21) Appl. No.: 17/447,883

(22) Filed: Sep. 16, 2021

(65) Prior Publication Data

US 2023/0080285 A1 Mar. 16, 2023

(51) Int. Cl.
*G02B 5/28* (2006.01)

(52) U.S. Cl.
CPC .................................... *G02B 5/28* (2013.01)

(58) Field of Classification Search
CPC .................................................. G02B 5/28
See application file for complete search history.

(56) References Cited

U.S. PATENT DOCUMENTS 10,900,834 B2 1/2021 Kasahara et al.
2018/0372546 A1* 12/2018 Enichlmair ............... G01J 3/26
2019/0056544 A1* 2/2019 Bahabad ................ G02B 5/203
2021/0109266 A1 4/2021 Houck

FOREIGN PATENT DOCUMENTS

EP 3182079 A1 6/2017
JP 2017215559 A 12/2017
WO 2019239139 A1 12/2019
WO 2021016636 A1 1/2021

OTHER PUBLICATIONS

Xinhao Li, et al.; "Grayscale stencil lithography for patterning multispectral color filters"; Sep. 4, 2020; pp. 1154-1161; Optica; vol. 7, No. 9; Optical Society of America.
Calum Williams, et al.; "Grayscale-to-Color: Scalable Fabrication of Custom Multispectral Filter Arrays"; Oct. 23, 2019; pp. 3132-3141; ACS Photonics; vol. 6; ACS Publications; American Chemical Society.
Calum Williams, et al.; "Grayscale-to-color: Single-step fabrication of bespoke multispectral filter arrays"; pp. 1-43.
Extended European Search Report for Application No. EP22195238.5, mailed on Feb. 17, 2023, 11 pages.
Extended European Search Report for European Application No. EP25185758.7 dated Oct. 22, 2025, 13 pages.

* cited by examiner

*Primary Examiner* — Wen Huang
(74) *Attorney, Agent, or Firm* — Harrity & Harrity, LLP

(57) ABSTRACT

An optical filter includes a first optical channel that includes a first mirror and a second mirror that are configured to reflect one or more ranges of an electromagnetic spectrum, and a first portion of a monolithic spacer that is positioned between the first and second mirrors. A second optical channel includes a third mirror and a fourth mirror that are configured to reflect one or more ranges of the electromagnetic spectrum, and a second portion of the monolithic spacer that is positioned between the third and fourth mirrors. A method of manufacturing the optical filter includes forming a first plurality of mirrors; forming, on the first plurality of mirrors, a monolithic spacer; forming a multilevel etch mask on the monolithic spacer using a grayscale lithography procedure; etching the multilevel etch mask and the monolithic spacer; and forming a second plurality of mirrors on the monolithic spacer.

20 Claims, 10 Drawing Sheets

630
Deposit multilevel etch mask 610 as part of grayscale lithography procedure

635
Expose multilevel etch mask 610 to light as part of grayscale lithography procedure

640
Etch multilevel etch mask 610 and/or monolithic spacer 606

OPTICAL FILTER

BACKGROUND

An optical sensor device may be utilized to capture information. For example, the optical sensor device may capture information relating to a set of electromagnetic frequencies. The optical sensor device may include a set of sensor elements (e.g., optical sensors, spectral sensors, and/or image sensors) that capture the information. For example, an array of sensor elements may be utilized to capture information relating to multiple frequencies. The sensor element array may be associated with an optical filter. The optical filter may include one or more channels that respectively pass particular frequencies to sensor elements of the sensor element array.

SUMMARY

In some implementations, an optical filter includes a plurality of optical channels, wherein: a first optical channel, of the plurality of optical channels, includes: a first mirror and a second mirror that are configured to reflect one or more ranges of an electromagnetic spectrum, and a first portion of a monolithic spacer that is positioned between the first mirror and the second mirror; and a second optical channel, of the plurality of optical channels, includes: a third mirror and a fourth mirror that are configured to reflect one or more ranges of the electromagnetic spectrum, and a second portion of the monolithic spacer that is positioned between the third mirror and the fourth mirror.

In some implementations, an optical sensor device includes an optical sensor comprising a plurality of sensor elements; and an optical filter comprising a plurality of optical channels, wherein: the plurality of optical channels are respectively disposed over the plurality of sensor elements, a particular optical channel, of the plurality of optical channels, includes: a first mirror and a second mirror that are configured to reflect one or more ranges of an electromagnetic spectrum, a particular portion of a monolithic spacer that is positioned between the first mirror and the second mirror, wherein one or more other portions of the monolithic spacer are respectively included in one or more other optical channels of the plurality of optical channels, and the particular optical channel has a critical dimension that is less than or equal to a critical dimension of a particular sensor element, of the plurality of sensor elements, on which the particular optical channel is disposed.

In some implementations, a method of manufacturing an optical filter includes forming, on a substrate, a first mirror and a second mirror, wherein the first mirror and the second mirror do not overlap each other; forming, on the first mirror and the second mirror, a monolithic spacer; forming a multilevel etch mask on the monolithic spacer; etching the multilevel etch mask and the monolithic spacer, wherein: etching the multilevel etch mask eliminates the multilevel etch mask, and etching the monolithic spacer causes a first portion of the monolithic spacer disposed on the first mirror to have a first thickness and a second portion of the monolithic spacer disposed on the second mirror to have a second thickness that is different than the first thickness; forming, on the first portion of the monolithic spacer, a third mirror, wherein the first mirror and the third mirror are configured to reflect one or more ranges of an electromagnetic spectrum; and forming, on the second portion of the monolithic spacer, a fourth mirror, wherein the second mirror and the fourth mirror are configured to reflect one or more ranges of the electromagnetic spectrum.

DETAILED DESCRIPTION

Figure 1:
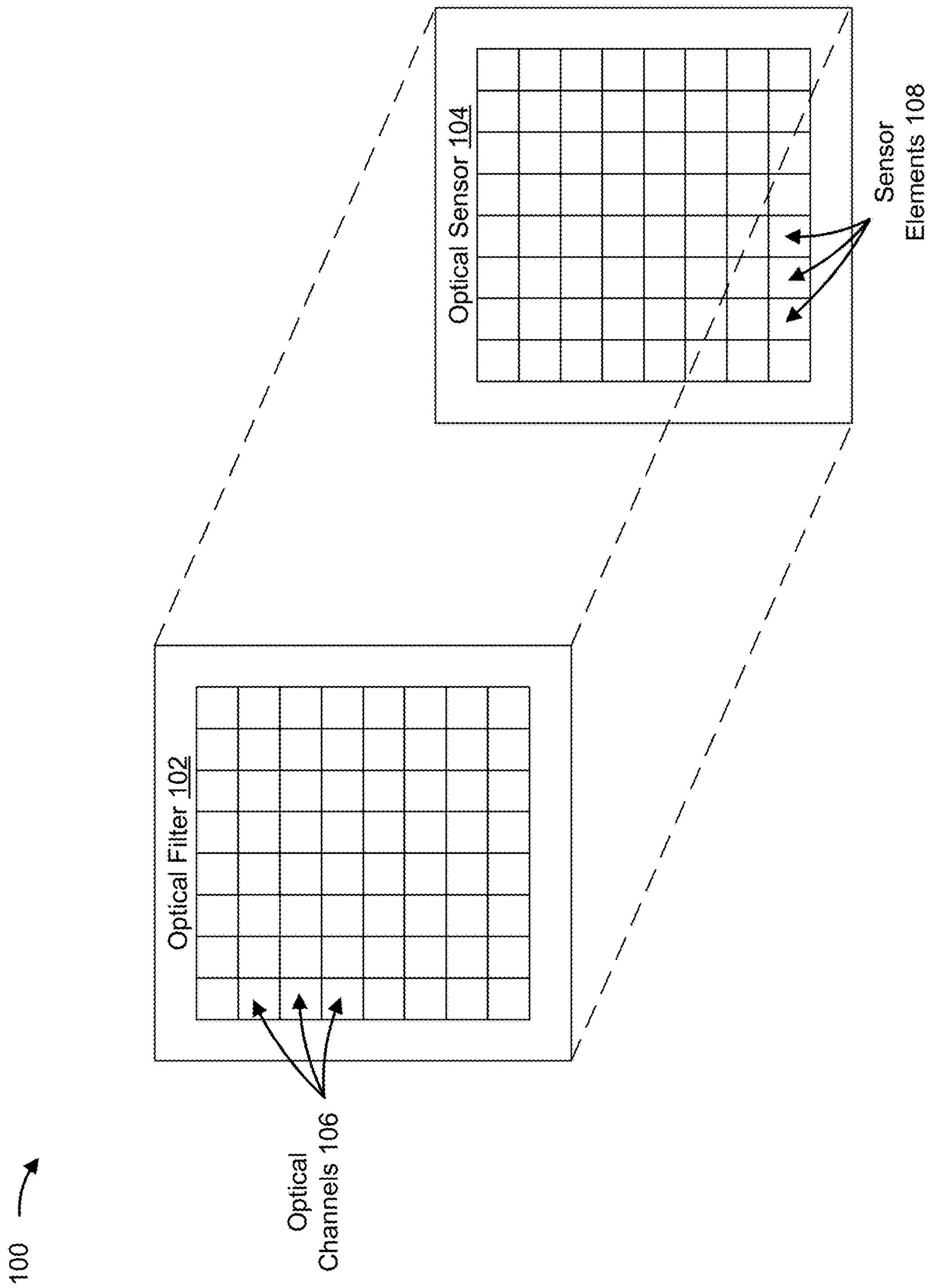
FIG. 1 is a diagram of an example optical sensor device described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical device (e.g., comprising a spectrometer or one or more other optical sensors and/or spectral sensors) may use filtered light to perform a measurement associated with a particular wavelength. In a typical configuration of an optical device, an optical filter comprises an array of optical channels that are disposed over a set of sensor elements of an optical sensor of the optical device. The array of optical channels is configured to pass light associated with different ranges of an electromagnetic spectrum. However, in many cases, such as when the array of optical channels is formed using a conventional lift-off process, each optical channel has a critical dimension that is larger than respective critical dimensions of the set of sensor elements. Consequently, when the set of sensor elements are positioned closely together (e.g., when a pitch associated with the set of sensor elements is less than the respective critical dimensions of the set of sensor elements), each optical channel is disposed over multiple sensor elements of the set of sensor elements, which inhibits a resolution of the optical sensor. Further, in other cases, such as when the array of optical channels is formed using a multistage etching process, there is an increased likelihood of etch-induced defects being introduced to the array of optical channels, which negatively impacts a performance of the optical filter.

Some implementations described herein provide an optical sensor device that includes an optical filter with a plurality of optical channels. Each of the plurality of optical channels includes a bottom mirror, a top mirror, and a portion of a monolithic spacer positioned between the bottom mirror and the top mirror. The top mirror and the bottom mirror may be configured to reflect one or more ranges of an electromagnetic spectrum (e.g., a same range or different ranges of the electromagnetic spectrum). Further, in some implementations, the monolithic spacer may be formed using an etching procedure in coordination with a grayscale lithography procedure. This may cause the portion of the monolithic spacer between the top mirror and the bottom mirror to have a particular thickness, which allows (in coordination with the reflective properties of the top mirror and the bottom mirror) the optical channel to pass a particular range of the electromagnetic spectrum.

In this way, when using an etching procedure in coordination with a grayscale lithography procedure to form a monolithic spacer that is included in a plurality of optical channels, respective critical dimensions of the plurality of optical channels are reduced as compared to when optical channels are formed using a conventional lift-off process. Accordingly, in some implementations, respective critical dimensions of the plurality of optical channels may be less than or equal to respective critical dimensions of a plurality of sensor elements of an optical sensor in the optical sensor device. Thus, when the plurality of optical channels are disposed over the plurality of sensor elements, one or more of the optical channels may be disposed over a single sensor element of the plurality of sensor elements, which increases a resolution of the optical sensor included in the optical sensor device (as compared to when a single optical channel of a typical optical filter is disposed over multiple sensor elements of optical sensor device). Further, some implementations described herein provide a single etching procedure to form the monolithic spacer, which decreases a likelihood that etch-induced defects are introduced into the plurality of optical channels (as compared to when a plurality of optical channels are formed using a multistage etching process). This thereby improves a performance of the optical filter as compared to a typical optical filter formed using a multistage etching process.

FIG. 1 is a diagram of an example optical sensor device 100 described herein. The optical sensor device 100 may include a spectrometer device that performs spectroscopy, such as a spectral optical sensor device (e.g., a binary multispectral optical sensor device that performs vibrational spectroscopy (such as a near infrared (NIR) spectrometer), a mid-infrared spectroscopy (mid-IR), Raman spectroscopy, and/or the like). As shown in FIG. 1, the optical sensor device 100 includes an optical filter 102 and an optical sensor 104.

As further shown in FIG. 1, the optical filter 102 may include a plurality of optical channels 106. The plurality of optical channels 106 may be arranged in a one-dimensional or a two-dimensional array on a surface of the optical filter 102. For example, as shown in FIG. 1, the plurality of optical channels 106 may be arranged in a two-dimensional array (e.g., where each row of the array includes 8 optical channels 106 and each column includes 8 optical channels 106). The plurality of optical channels 106 may respectively pass different ranges of an electromagnetic spectrum (e.g., pass light with different wavelength ranges).

The optical sensor 104 includes a device capable of sensing light. For example, optical sensor 104 may include an image sensor, a multispectral sensor, a spectral sensor, and/or the like. In some implementations, optical sensor 104 may include a silicon (Si) based sensor, an indium-gallium-arsenide (InGaAs) based sensor, a lead-sulfide (PbS) based sensor, or a germanium (Ge) based sensor, and may utilize one or more sensor technologies, such as a complementary metal-oxide-semiconductor (CMOS) technology, or a charge-coupled device (CCD) technology, among other examples. In some implementations, optical sensor 104 may include a front-side illumination (FSI) sensor, a back-side illumination (BSI) sensor, and/or the like.

As further shown in FIG. 1, the optical sensor 104 may include a plurality of sensor elements 108. The plurality of sensor elements 108 may be arranged in a one-dimensional or a two-dimensional array on a surface of the optical sensor 104. In some implementations, an arrangement of the plurality of sensor elements 108 on the surface of the optical sensor 104 may correspond to an arrangement of the plurality of optical channels 106 on the surface of the optical filter 102, such that an optical channel 106 may be configured to pass a range of particular electromatic frequencies (e.g., pass light associated with a particular wavelength range) to one or more sensor elements 108. For example, as shown in FIG. 1, the plurality of optical channels 106 and the plurality of sensor elements 108 may each be arranged in a corresponding two-dimensional array (e.g., an 8×8 array).

A sensor element 108 may be configured to obtain information regarding light that falls incident on the sensor element 108 (e.g., after passing through an optical channel 106). For example, a sensor element 108 may provide an indication of intensity of light that falls incident on the sensor element 108 (e.g., active/inactive, or a more granular indication of intensity). The optical sensor 104 may be configured to collect the information obtained by the one or more sensor elements 108 to generate sensor data.

As further shown in FIG. 1, the optical filter 102 may be disposed over the optical sensor 104 (e.g., such that an arrangement of the optical channels 106 is aligned with an arrangement of the sensor elements 108). The optical filter 102 may be directly disposed on the optical sensor 104 or may be separated from the optical sensor 104 by a free space gap.

As indicated above, FIG. 1 is provided as an example. Other examples may differ from what is described with regard to FIG. 1.

Figure 2:
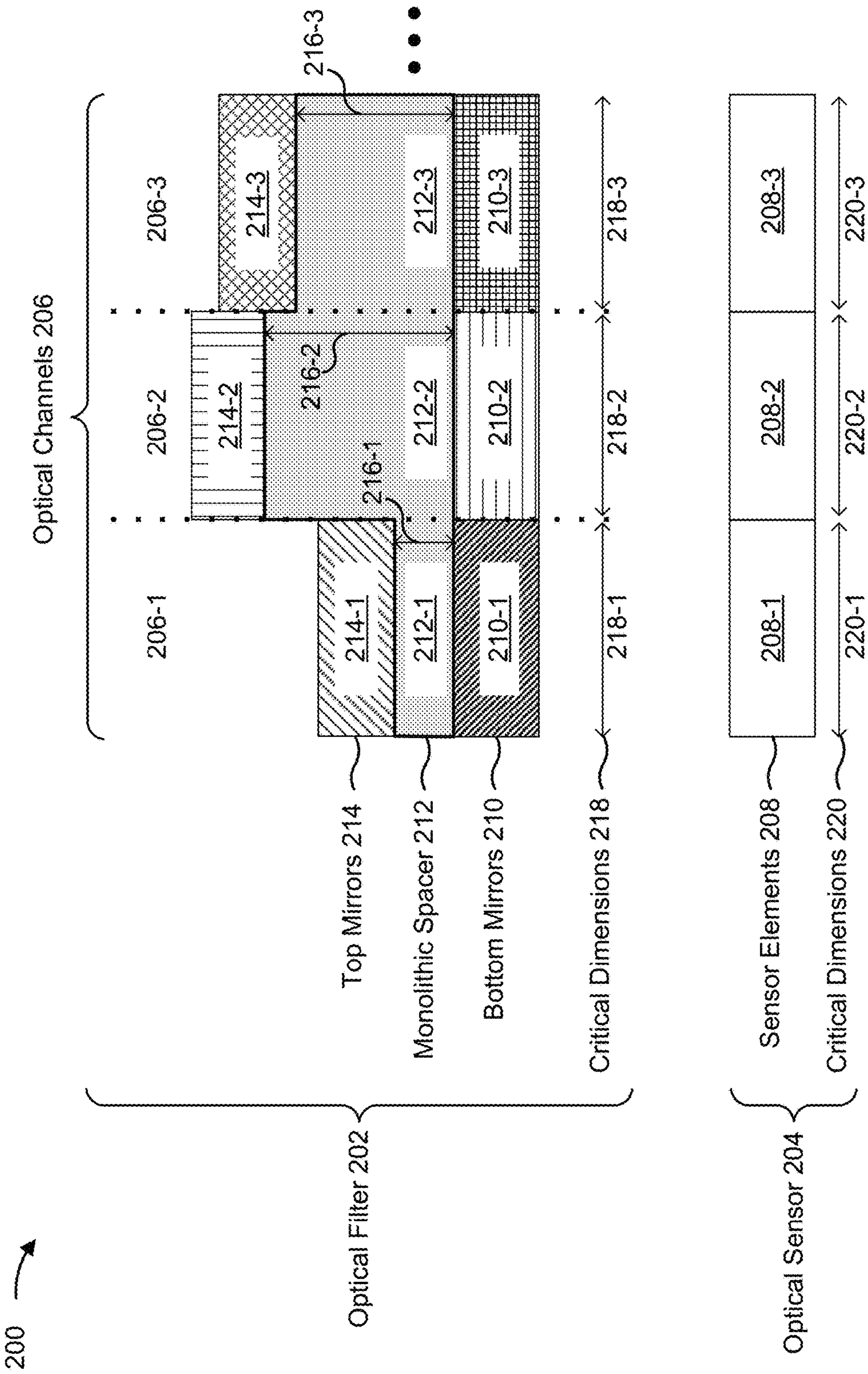
FIG. 2 is a diagram of a side-view of example optical sensor device described herein.

FIG. 2 is a diagram of a side-view of example optical sensor device 200 described herein. As shown in FIG. 2, the optical sensor device 200 includes an optical filter 202 and an optical sensor 204 that respectively include a plurality of optical channels 206 (shown as optical channels 206-1 through 206-3) and a plurality of sensor elements 208 (shown as sensor elements 208-1 through 208-3). The optical filter 202, the optical sensor 204, the plurality of optical channels 206, and the plurality of sensor elements 208 may be the same as, or similar to, the optical filter 102, the optical sensor 104, the plurality of optical channels 106, and the plurality of sensor elements 108, respectively, as described herein in relation to FIG. 1.

As further shown in FIG. 2, the optical filter 202 may include a plurality of bottom mirrors 210 (shown as bottom mirrors 210-1 through 210-3), a monolithic spacer 212 (e.g., that includes a plurality of portions, shown as 212-1 through 212-3), and/or a plurality of top mirrors 214 (shown as top mirrors 214-1 through 214-3). The monolithic spacer 212 may be positioned between the plurality of bottom mirrors 210 and the plurality of top mirrors 214. For example, as further shown in FIG. 2, the monolithic spacer 212 may be disposed on the plurality bottom mirrors 210, and the plurality of top mirrors 214 may be disposed on the monolithic spacer 212.

Each mirror, of the plurality of bottom mirrors 210 and/or the plurality of top mirrors 214, may comprise one or more metals, one or more dielectric materials, and/or one or more semiconductor materials, among other examples. Each mirror may be configured to reflect a particular range of an electromagnetic spectrum (e.g., reflect light with a wavelength that is within a particular wavelength range). The electromagnetic spectrum may include, for example, one or more portions of ultraviolet light (e.g., one or more portions of light with a wavelength that is within 100 to 379 nm), one or more portions of visible light (e.g., one or more portions of light with a wavelength that is within 380 to 779 nm), one or more portions of near-infrared light (e.g., one or more portions of light with a wavelength that is within 780 to 1399 nm), one or more portions of short-wave infrared light (e.g., one or more portions of light with a wavelength that is within 1400 to 2999 nm), one or more portions of mid-wave infrared light (e.g., one or more portions of light with a wavelength that is within 3000 to 7999 nm), or one or more portions of long-wave infrared light (e.g., one or more portions of light with a wavelength that is within 8000 nm to 15000 nm).

The monolithic spacer 212 may comprise one or more materials, such as at least one of a silicon (Si) material, a hydrogenated silicon (Si:H) material, an amorphous silicon (a-Si) material, a silicon nitride (SiN) material, a germanium (Ge) material, a hydrogenated germanium (Ge:H) material, a silicon germanium (SiGe) material, a hydrogenated silicon germanium (SiGe:H) material, a silicon carbide (SiC) material, a hydrogenated silicon carbide (SiC:H) material, a silicon dioxide ($SiO_2$) material, a tantalum pentoxide ($Ta_2O_5$) material, a niobium pentoxide ($Nb_2O_5$) material, a niobium titanium oxide (NbTiOx) material, a niobium tantalum pentoxide ($Nb_2TaO_5$) material, a titanium dioxide ($TiO_2$) material, an aluminum oxide ($Al_2O_3$) material, a zirconium oxide ($ZrO_2$) material, an yttrium oxide ($Y_2O_3$) material, an aluminum nitride (AlN), or a hafnium oxide ($HfO_2$) material, among other examples. The monolithic spacer 212 may be formed as a single spacer (e.g., rather than a spacer comprising discrete parts or layers). Additionally, or alternatively, the monolithic spacer 212 may have a uniform, or substantially uniform, crystal lattice structure (e.g., the monolithic spacer 212 may not include any interfaces within the monolithic spacer 212). For example, the monolithic spacer 212 may be formed as a single spacer using an etching procedure (e.g., in coordination with a grayscale lithography procedure), as further described herein in relation to FIG. 6D.

In some implementations, a particular optical channel 206, of the plurality of optical channels 206, may include a particular bottom mirror 210, of the plurality of bottom mirrors 210; a particular top mirror 214, of the plurality of top mirrors 214; and a particular portion of the monolithic spacer 212 (e.g., that is positioned between the particular bottom mirror 210 and the particular top mirror 214). For example, as shown in FIG. 2, the optical channel 206-1 may include the bottom mirror 210-1, the top mirror 214-1, and a first portion of the monolithic spacer 212-1 that is positioned between the bottom mirror 210-1 and the top mirror 214-1; the optical channel 206-2 may include the bottom mirror 210-2, the top mirror 214-2, and a second portion of the monolithic spacer 212-2 that is positioned between the bottom mirror 210-2 and the top mirror 214-2; and the optical channel 206-3 may include the bottom mirror 210-3, the top mirror 214-3, and a first portion of the monolithic spacer 212-3 that is positioned between the bottom mirror 210-3 and the top mirror 214-3.

In some implementations, the particular bottom mirror 210 and the particular top mirror 214 of the particular optical channel 206 may be configured to reflect one or more ranges of the electromagnetic spectrum (e.g., a same range of the electromagnetic spectrum or different ranges of the electromagnetic spectrum). For example, as shown in FIG. 2, for the optical channel 206-1, the bottom mirror 210-1 may be configured to reflect a first range of the electromagnetic spectrum (as indicated by a left-to-right diagonal line pattern), and the top mirror 214-1 may be configured to reflect a second range of the electromagnetic spectrum (as indicated by a right-to-left diagonal line pattern), where the first range and the second range are different (e.g., at least some of the first range and the second range are not coextensive); for the optical channel 206-2, the bottom mirror 210-2 may be configured to reflect a third range of the electromagnetic spectrum (as indicated by a horizontal line pattern) and the top mirror 214-2 may be configured to reflect a fourth range of the electromagnetic spectrum (as indicated by a vertical line pattern), where the third range and the fourth range are different (e.g., at least some of the third range and the fourth range are not coextensive); and for the optical channel 206-3, the bottom mirror 210-3 may be configured to reflect a fifth range of the electromagnetic spectrum (as indicated by a square line pattern) and the top mirror 214-3 may be configured to reflect a sixth range of the electromagnetic spectrum (as indicated by a diamond line pattern), where the fifth range and the sixth range are different (e.g., at least some of the fifth range and the sixth range are not coextensive). In a particular example, the bottom mirror 210-1 may be configured to reflect light with a wavelength that is within a 380 to 500 nm range, the top mirror 214-1 may be configured to reflect light with a wavelength that is within a 380 to 950 nm range, the bottom mirror 210-2 may be configured to reflect light with a wavelength that is within a 500 to 650 nm range, the top mirror 214-2 may be configured to reflect light with a wavelength that is within a 650 to 800 nm range, the bottom mirror 210-3 may be configured to reflect light with a wavelength that is within a 730 to 1060 nm range, and the top mirror 214-3 may be configured to reflect light with a wavelength that is within a 1100 to 1600 nm range.

In some implementations, the monolithic spacer 212 may be configured to be transparent for one or more ranges of the electromagnetic spectrum. For example, the monolithic spacer 212 may be configured to transmit greater than a threshold percentage of light that has a wavelength that is within at least one of the first range of the electromagnetic spectrum, the second range of the electromagnetic spectrum, the third range of the electromagnetic spectrum, the fourth range of the electromagnetic spectrum, the fifth range of the electromagnetic spectrum, or the sixth range of the electromagnetic spectrum described in the example above. As another example, when the particular portion of the monolithic spacer 212 is positioned between the particular bottom mirror 210 and the particular top mirror 214 in the particular optical channel 206, the particular portion of the monolithic spacer 212 may be configured to transmit greater than the threshold percentage of light that has a wavelength that is within each of a first particular range of the electromagnetic spectrum that the particular bottom mirror 210 is configured to reflect and a second particular range of the electromagnetic spectrum that the particular top mirror 214 is configured to reflect. The threshold percentage of light may be greater than or equal to 30%, 50%, 75%, 90%, 95%, or 99%, for example.

In some implementations, the plurality of bottom mirrors 210 may be disposed on a first side of the monolithic spacer 212 (e.g., a bottom side of the monolithic spacer 212), and the plurality of top mirrors 214 may be disposed on a second side of the monolithic spacer 212 (e.g., a top side of the monolithic spacer 212). Any two bottom mirrors 210, of the plurality of bottom mirrors 210, may be configured to reflect one or more ranges of the electromagnetic spectrum (e.g., a same range of the electromagnetic spectrum or different ranges of the electromagnetic spectrum). For example, as shown in FIG. 2, the bottom mirror 210-1 may be configured to reflect a first range of the electromagnetic spectrum (as indicated by the left-to-right diagonal line pattern), and the bottom mirror 210-2 may be configured to reflect a second range of the electromagnetic spectrum (as indicated by the horizontal line pattern), where the first range and the second range are different (e.g., at least some of the first range and the second range are not coextensive). Any two top mirrors 214, of the plurality of top mirrors 214, may be configured to reflect one or more ranges of the electromagnetic spectrum (e.g., a same range of the electromagnetic spectrum or different ranges of the electromagnetic spectrum). For example, as shown in FIG. 2, the top mirror 214-1 may be configured to reflect a third range of the electromagnetic spectrum (as indicated by the right-to-left diagonal line pattern), and the top mirror 214-2 may be configured to reflect a fourth range of the electromagnetic spectrum (as indicated by the vertical line pattern), where the third range and the fourth range are different (e.g., at least some of the third range and the fourth range are not coextensive).

In some implementations, two or more portions of the monolithic spacer 212 may have different thicknesses. For example, as shown in FIG. 2, a thickness 216-1 of the first portion of the monolithic spacer 212-1 may be different than a thickness 216-2 of the second portion of the monolithic spacer 212-2. Further, the thickness 216-1 and the thickness 216-2 may each be different than a thickness 216-3 of the third portion of the monolithic spacer 212-3. In some implementations, a difference between a thickness of a particular portion of the monolithic spacer 212 and a thickness of another portion of the monolithic spacer 212 may be less than or equal to a particular difference threshold. The particular difference threshold may be less than or equal to 2 nanometers (nm), 6 nm, or 10 nm, among other examples.

In some implementations, each optical channel 206, of the plurality of optical channels 206, may have a critical dimension 218 (e.g., a maximum dimension, such as a width, of the optical channel 206), and each sensor element 208, of the plurality of sensor elements 208, may have a critical dimension 220 (e.g., a maximum dimension, such as a width, of the sensor element 208). For example, as shown in FIG. 2, the optical channel 206-1 may have a critical dimension 218-1, the optical channel 206-2 may have a critical dimension 218-2, and the optical channel 206-3 may have a critical dimension 218-3. Further, the sensor element 208-1 may have the critical dimension 220-1, the sensor element 208-2 may have the critical dimension 220-2, and the sensor element 208-3 may have the critical dimension 220-3. In some implementations, the respective critical dimensions 218 of the plurality optical channels 206 and the respective critical dimensions 220 of the sensor elements 208 may be less than or equal to a critical dimension threshold. The critical dimension threshold may be, for example, less than or equal to 2 microns, 4 microns, or 6 microns. Additionally, or alternatively, the respective critical dimensions 218 of the plurality optical channels 206 may be less than or equal to the respective critical dimensions 220 of the sensor elements 208. Accordingly, when the plurality of optical channels 206 are disposed over the plurality of sensor elements 208 (e.g., as described herein in relation to FIG. 1), one or more of the optical channels 206 may disposed over a single sensor element 208 of the plurality of sensor elements 208.

As indicated above, FIG. 2 is provided as an example. Other examples may differ from what is described with regard to FIG. 2.

Figure 3:
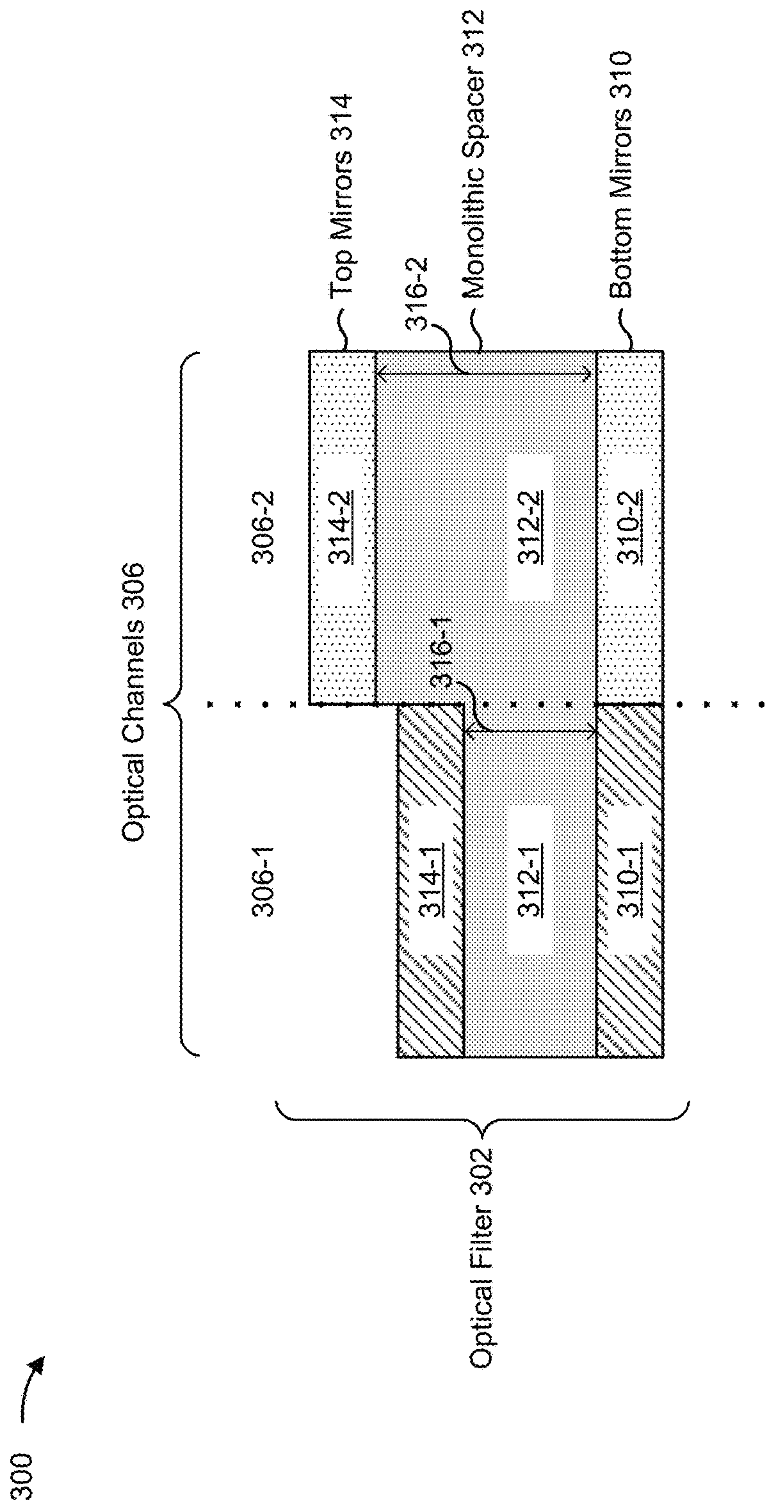
FIG. 3 is a diagram of a side-view of an example optical sensor device described herein.

FIG. 3 is a diagram of a side-view of an example optical sensor device 300 described herein. As shown in FIG. 3, the optical sensor device 300 includes an optical filter 302 that includes a plurality of optical channels 306 (shown as optical channels 306-1 and 306-2) that are the same as, or similar to, corresponding elements described herein in relation to FIGS. 1-2. For example, the optical filter 302 may include a plurality of bottom mirrors 310 (shown as bottom mirrors 310-1 and 310-2), a monolithic spacer 312 (e.g., that includes a plurality of portions, shown as 312-1 and 312-2), and/or a plurality of top mirrors 314 (shown as top mirrors 314-1 and 314-2). The monolithic spacer 312 may be positioned between the plurality of bottom mirrors 310 and the plurality of top mirrors 314. Accordingly, a particular optical channel 306, of the plurality of optical channels 306, may include a particular bottom mirror 310, of the plurality of bottom mirrors 310; a particular top mirror 314, of the plurality of top mirrors 314; and a particular portion of the monolithic spacer 312 (e.g., that is positioned between the particular bottom mirror 310 and the particular top mirror 314).

As shown in FIG. 3, the optical channel 306-1 may include the bottom mirror 310-1, the top mirror 314-1, and a first portion of the monolithic spacer 312-1 that is positioned between the bottom mirror 310-1 and the top mirror 314-1, and the optical channel 306-2 may include the bottom mirror 310-2, the top mirror 314-2, and a second portion of the monolithic spacer 312-2 that is positioned between the bottom mirror 310-2 and the top mirror 314-2. As further shown in FIG. 3, for the optical channel 306-1, the bottom mirror 310-1 and the top mirror 314-1 may each be configured to reflect a first range of the electromagnetic spectrum (e.g., a same range of the electromagnetic spectrum, as indicated by a right-to-left diagonal line pattern), and, for the optical channel 306-2, the bottom mirror 310-2 and the top mirror 314-2 may each be configured to reflect a same range of the electromagnetic spectrum (a same range of the electromagnetic spectrum, as indicated by a dot pattern).

The monolithic spacer 312 may be configured to be transparent for the first range and the second range of the electromagnetic spectrum. For example, the monolithic spacer 312 may be configured to transmit greater than a threshold percentage of light (e.g., greater than 30%, 50%, 75%, 90%, 95%, or 99% of light) that has a wavelength that is within the first range and the second range of the electromagnetic spectrum. In some implementations, two or more portions of the monolithic spacer 312 may have different thicknesses. For example, as shown in FIG. 3, a thickness 316-1 of the first portion of the monolithic spacer 312-1 may be different than a thickness 316-2 of the second portion of the monolithic spacer 312-2. In some implementations, a difference between a thickness of a particular portion of the monolithic spacer 312 and a thickness another portion of the monolithic spacer 312 may be less than or equal to a particular difference threshold. The particular difference threshold may be less than or equal to 3 nm, 6 nm, or 10 nm, among other examples.

As indicated above, FIG. 3 is provided as an example. Other examples may differ from what is described with regard to FIG. 3.

Figure 4:
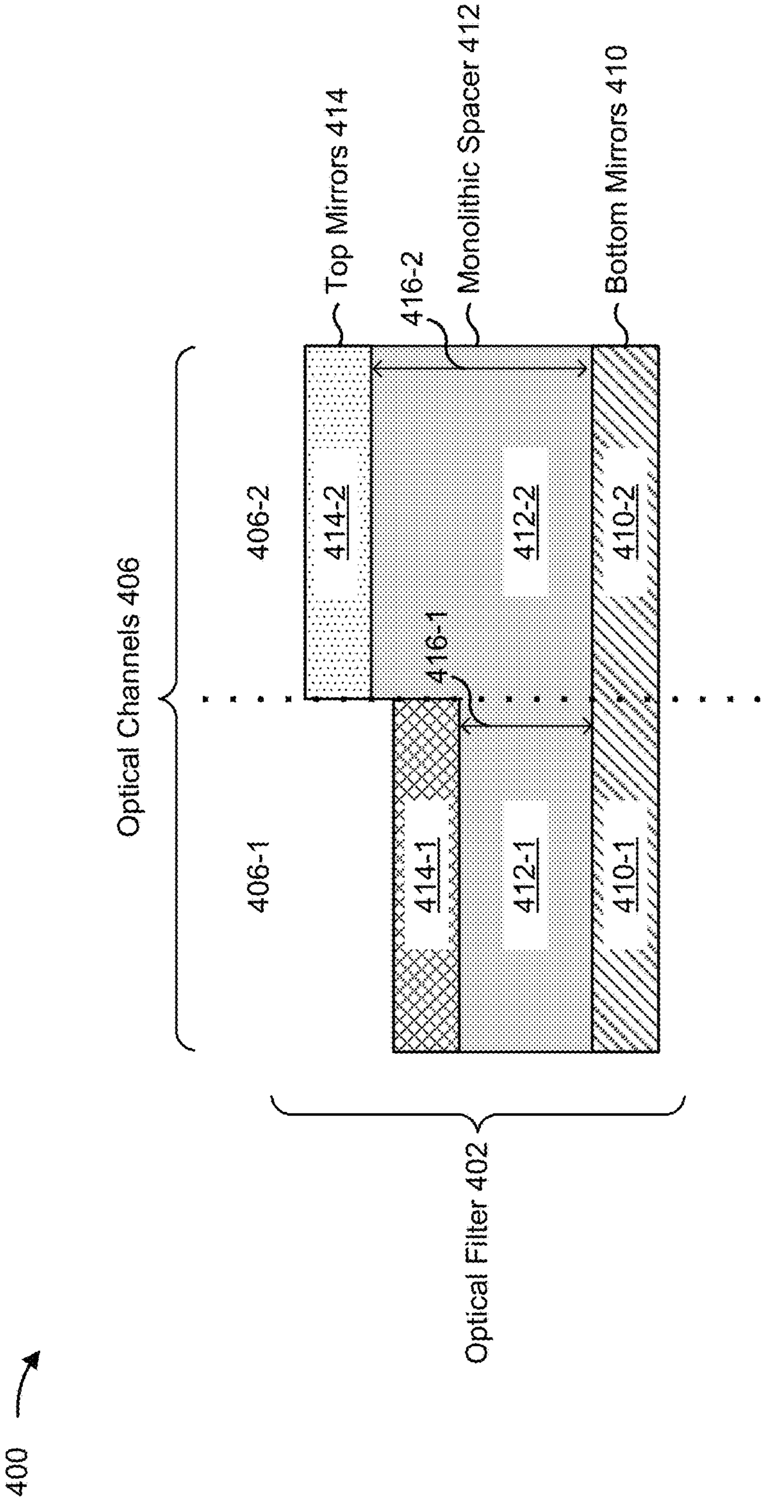
FIG. 4 is a diagram of a side-view of an example optical sensor device described herein.

FIG. 4 is a diagram of a side-view of an example optical sensor device 400 described herein. As shown in FIG. 4, the optical sensor device 400 includes an optical filter 402 that includes a plurality of optical channels 406 (shown as optical channels 406-1 and 406-2) that are the same as, or similar to, corresponding elements described herein in relation to FIGS. 1-3. For example, the optical filter 402 may include a plurality of bottom mirrors 410 (shown as bottom mirrors 410-1 and 410-2), a monolithic spacer 412 (e.g., that includes a plurality of portions, shown as 412-1 and 412-2), and/or a plurality of top mirrors 414 (shown as top mirrors 414-1 and 414-2). The monolithic spacer 412 may be positioned between the plurality of bottom mirrors 410 and the plurality of top mirrors 414. Accordingly, a particular optical channel 406, of the plurality of optical channels 406, may include a particular bottom mirror 410, of the plurality of bottom mirrors 410; a particular top mirror 414, of the plurality of top mirrors 414; and a particular portion of the monolithic spacer 412 (e.g., that is positioned between the particular bottom mirror 410 and the particular top mirror 414).

As shown in FIG. 4, the optical channel 406-1 may include the bottom mirror 410-1, the top mirror 414-1, and a first portion of the monolithic spacer 412-1 that is positioned between the bottom mirror 410-1 and the top mirror 414-1, and the optical channel 406-2 may include the bottom mirror 410-2, the top mirror 414-2, and a second portion of the monolithic spacer 412-2 that is positioned between the bottom mirror 410-2 and the top mirror 414-2. As further shown in FIG. 4, for the optical channel 406-1, the bottom mirror 410-1 may be configured to reflect a first range of the electromagnetic spectrum (as indicated by a right-to-left diagonal line pattern) and the top mirror 414-1 may be configured to reflect a second range of the electromagnetic spectrum (as indicated by a diamond line pattern) that is different than the first range. For the optical channel 406-2, the bottom mirror 410-2 may be configured to reflect the first range of the electromagnetic spectrum (as indicated by the right-to-left diagonal line pattern) and the top mirror 414-2 may be configured to reflect a third range of the electromagnetic spectrum (as indicated by a dot pattern) that is different than the first range. In this way, each of the plurality of bottom mirrors 410 (e.g., that are disposed on a same side of the monolithic spacer 412) may be configured to reflect a same portion of the electromagnetic spectrum.

The monolithic spacer 412 may be configured to be transparent for the first range, the second range, and the third range of the electromagnetic spectrum. For example, the monolithic spacer 212 may be configured to transmit greater than a threshold percentage of light (e.g., greater than 30%, 50%, 75%, 90%, 95%, or 99% of light) that has a wavelength that is the first range, the second range, and the third range of the electromagnetic spectrum. In some implementations, two or more portions of the monolithic spacer 412 may have different thicknesses. For example, as shown in FIG. 4, a thickness 416-1 of the first portion of the monolithic spacer 412-1 may be different than a thickness 416-2 of the second portion of the monolithic spacer 412-2. In some implementations, a difference between a thickness of a particular portion of the monolithic spacer 412 and a thickness another portion of the monolithic spacer 412 may be less than or equal to a particular difference threshold. The particular difference threshold may be less than or equal to 4 nm, 6 nm, or 10 nm, among other examples.

As indicated above, FIG. 4 is provided as an example. Other examples may differ from what is described with regard to FIG. 4.

Figure 5:
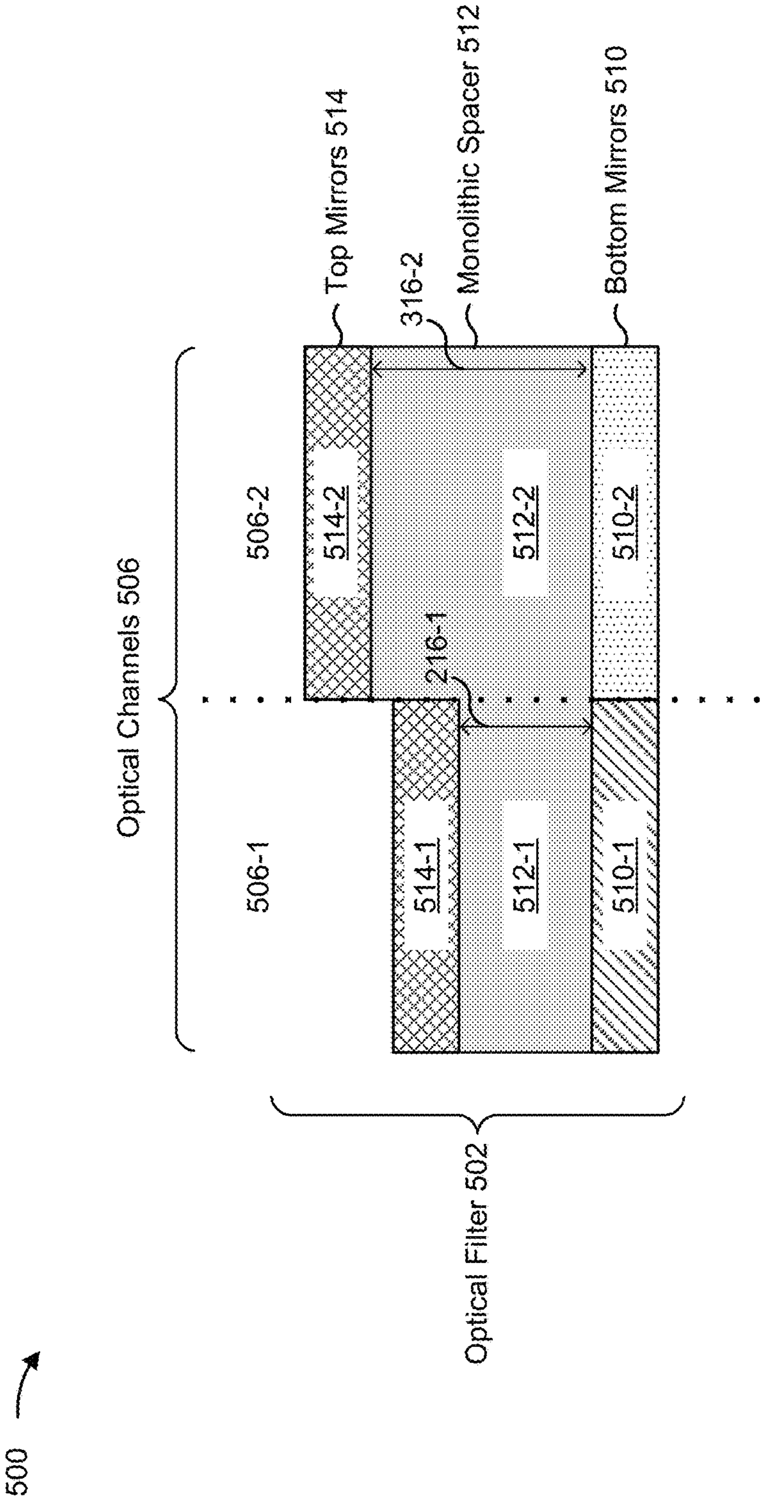
FIG. 5 is a diagram of a side-view of an example optical sensor device described herein

FIG. 5 is a diagram of a side-view of an example optical sensor device 500 described herein. As shown in FIG. 5, the optical sensor device 500 includes an optical filter 502 that includes a plurality of optical channels 506 (shown as optical channels 506-1 and 506-2) that are the same as, or similar to, corresponding elements described herein in relation to FIGS. 1-4. For example, the optical filter 502 may include a plurality of bottom mirrors 510 (shown as bottom mirrors 510-1 and 510-2), a monolithic spacer 512 (e.g., that includes a plurality of portions, shown as 512-1 and 512-2), and/or a plurality of top mirrors 514 (shown as top mirrors 514-1 and 514-2). The monolithic spacer 512 may be positioned between the plurality of bottom mirrors 510 and the plurality of top mirrors 514. Accordingly, a particular optical channel 506, of the plurality of optical channels 506, may include a particular bottom mirror 510, of the plurality of bottom mirrors 510; a particular top mirror 514, of the plurality of top mirrors 514; and a particular portion of the monolithic spacer 512 (e.g., that is positioned between the particular bottom mirror 510 and the particular top mirror 514).

As shown in FIG. 5, the optical channel 506-1 may include the bottom mirror 510-1, the top mirror 514-1, and a first portion of the monolithic spacer 512-1 that is positioned between the bottom mirror 510-1 and the top mirror 514-1, and the optical channel 506-2 may include the bottom mirror 510-2, the top mirror 514-2, and a second portion of the monolithic spacer 512-2 that is positioned between the bottom mirror 510-2 and the top mirror 514-2. As further shown in FIG. 5, for the optical channel 506-1, the bottom mirror 510-1 may be configured to reflect a first range of the electromagnetic spectrum (as indicated by a right-to-left diagonal line pattern) and the top mirror 514-1 may be configured to reflect a second range of the electromagnetic spectrum (as indicated by a diamond line pattern) that is different than the first range. For the optical channel 506-2, the bottom mirror 510-2 may be configured to reflect a third range of the electromagnetic spectrum (as indicated by a dot pattern) and the top mirror 514-2 may be configured to reflect the second range of the electromagnetic spectrum (as indicated by a diamond line pattern) that is different than the third range. In this way, each of the plurality of top mirrors 514 (e.g., that are disposed on a same side of the monolithic spacer 512) may be configured to reflect a same portion of the electromagnetic spectrum.

The monolithic spacer 512 may be configured to be transparent for the first range, the second range, and the third range of the electromagnetic spectrum. For example, the monolithic spacer 212 may be configured to transmit greater than a threshold percentage of light (e.g., greater than 30%, 50%, 75%, 90%, 95%, or 99% of light) that has a wavelength that is within the first range, the second range, and the third range of the electromagnetic spectrum. In some implementations, two or more portions of the monolithic spacer 512 may have different thicknesses. For example, as shown in FIG. 5, a thickness 516-1 of the first portion of the monolithic spacer 512-1 may be different than a thickness 516-2 of the second portion of the monolithic spacer 512-2. In some implementations, a difference between a thickness of a particular portion of the monolithic spacer 512 and a thickness another portion of the monolithic spacer 512 may be less than or equal to a particular difference threshold. The particular difference threshold may be less than or equal to 5 nm, 6 nm, or 10 nm, among other examples.

As indicated above, FIG. 5 is provided as an example. Other examples may differ from what is described with regard to FIG. 5.

FIGS. 6A-6E are diagrams of an example implementation 600 of a formation process for manufacturing an optical filter (e.g., an optical filter that is the same as, or similar to, the optical filters 102, 202, 302, 402, and/or 502 described in relation to FIGS. 1-5). As shown in FIGS. 6A-6E, the optical filter may be formed by forming, on a substrate 602, a plurality of bottom mirrors 604 (e.g., that are the same as, or similar to, the bottom mirrors 210, 310, 410, and/or 510 described herein in relation FIGS. 2-5, shown as bottom mirrors 604-1 through 604-N, where N≥2), a monolithic spacer 606 (e.g., that is the same as, or similar to, the monolithic spacer 212, 312, 412, and/or 512 described herein in relation FIGS. 2-5, shown with portions of the monolithic spacer 606-1 through 606-N), a plurality of top mirrors 608 (e.g., that are the same as, or similar to, the top mirrors 214, 314, 414, and/or 514 described herein in relation FIGS. 2-5, shown as top mirrors 608-1 through 608-N), and a multilevel etch mask 610 (shown with portions of the multilevel etch masks 610-1 through 610-N). In some implementations, one or more layers and/or structures may be fabricated using a sputtering procedure, a photolithographic procedure, a grayscale lithography procedure, an etching procedure, a lift off procedure, a scraping procedure, an annealing procedure, a molding procedure, a casting procedure, a machining procedure, and/or a stamping procedure, among other examples.

Figure 6A:
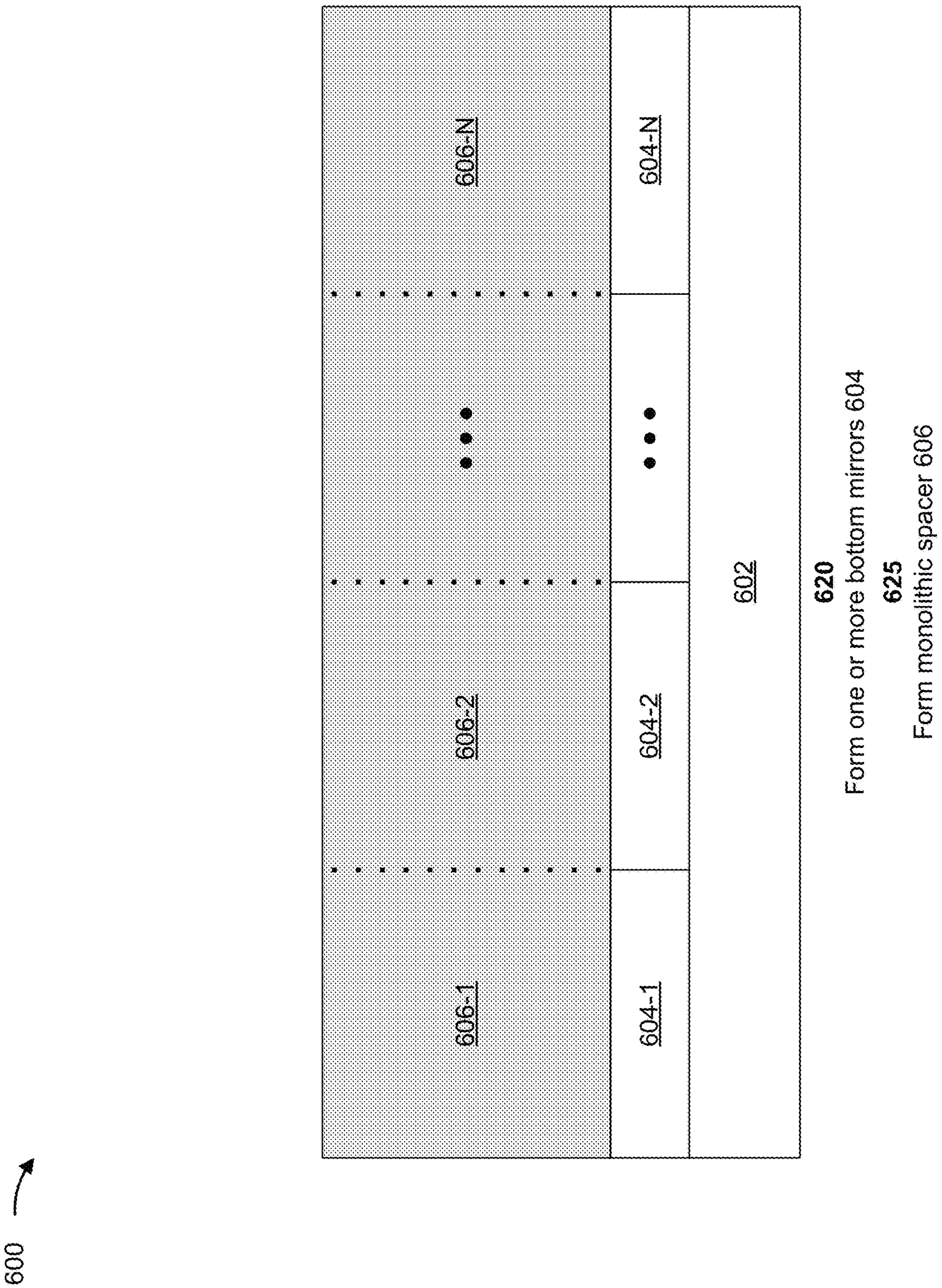
FIGS. 6A-6E are diagrams of an example implementation of a formation process for manufacturing an optical filter described herein.

The substrate 602 may include a silicon (Si) substrate, a gallium arsenide (GaAs) substrate, an indium phosphide (InP) substrate, a germanium (Ge) substrate, and/or another type of substrate. As shown in FIG. 6A, and by reference number 620, the formation process may include forming the plurality of bottom mirrors 604 on the substrate 602. For example, the formation process may include forming a first bottom mirror 604-1 on a first region of a surface of the substrate 602 (e.g., a first region of a top surface of the substrate 602), a second bottom mirror 604-2 on a second region of the surface of the substrate 602, and so on. In this way, the one or more bottom mirrors 604 may be formed on the substrate 602 such that the one or more bottom mirrors 604 do not overlap each other.

As further shown in FIG. 6A, and by reference number 625, the formation process may include forming the monolithic spacer 606 on the one or more bottom mirrors 604. For example, the formation process may include forming the monolithic spacer 606 on respective surfaces of the one or more bottom mirrors 604 (e.g., respective top surfaces of the one or more bottom mirrors 604). For example, a first portion of the monolithic spacer 606-1 may be formed over the top surface of the first bottom mirror 604-1, a second portion of the monolithic spacer 606-2 may be formed over the top surface of the second bottom mirror 604-2, and so on. As further shown in FIG. 6A, the monolithic spacer 606 may be formed with a uniform, or substantially uniform, thickness. For example, a thickness of a portion of the monolithic spacer 606 may be the same as, within a tolerance (e.g., that is less than or equal to 6 microns), a thickness of any other portion of the monolithic spacer 606.

Figure 6B:
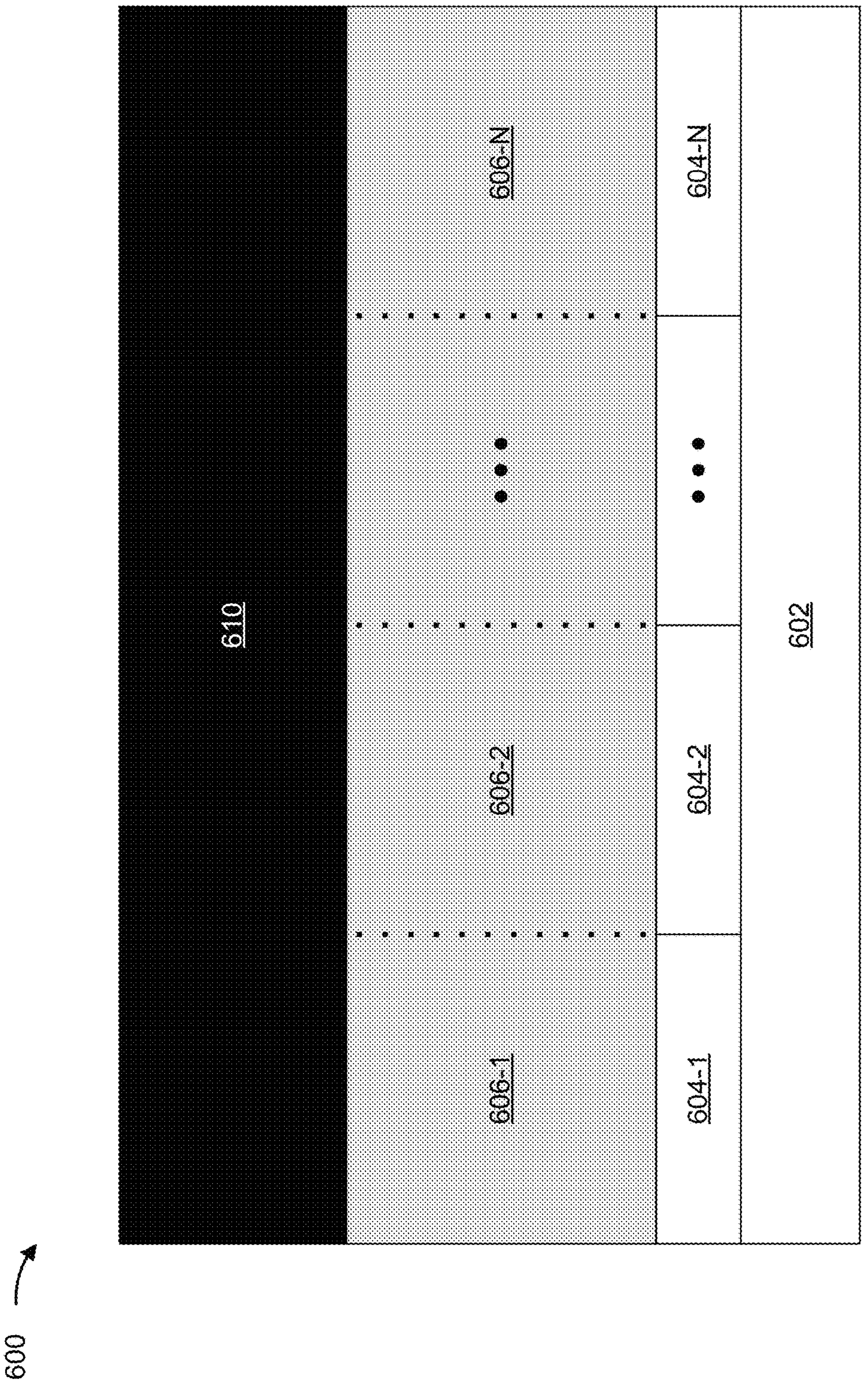
Figure 6C:
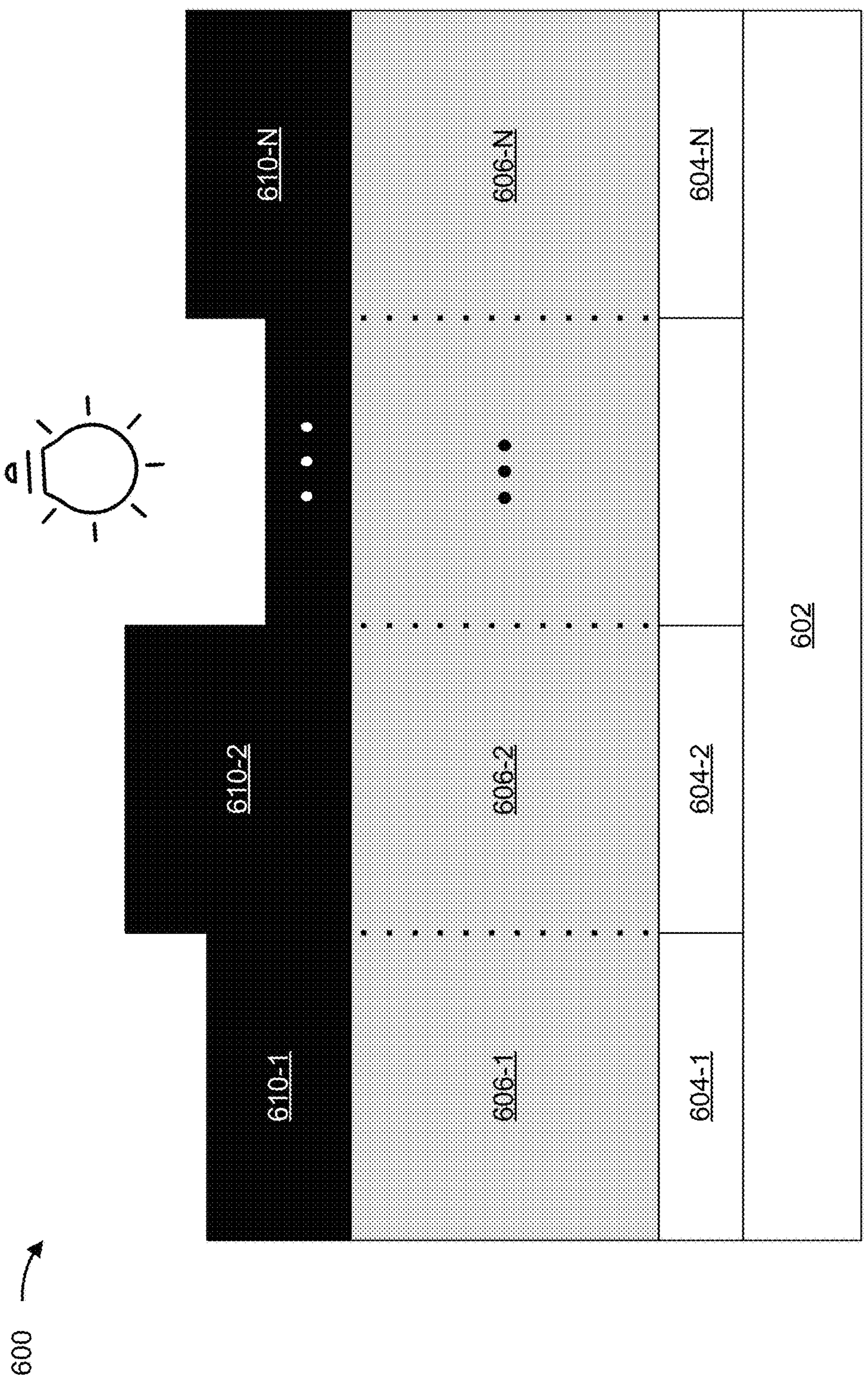

The multilevel etch mask 610 may comprise a photo-sensitive material, such as a photo-sensitive polymer. As shown in FIGS. 6B-6C, the formation process may include forming the multilevel etch mask 610 on the monolithic spacer 606. In some implementations, the multilevel etch mask 610 may be formed using a grayscale lithography procedure, such as a grayscale electron beam lithography procedure or a grayscale photolithography procedure. For example, as shown in FIG. 6B, and by reference number 630, when using the grayscale lithography procedure, the formation process may include depositing the multilevel etch mask 610 on the monolithic spacer 606. As shown in FIG. 6C, and by reference number 635, when using the grayscale lithography procedure, the formation process may further include exposing the multilevel etch mask 610 to different amounts of light (e.g., ultraviolet (UV) light) to cause one or more portions of the multilevel etch mask 610 (shown as portions of the multilevel etch mask 610-1 through 610-N) to have different thicknesses (e.g., to have multiple levels). The one or more portions of the multilevel etch mask 610 may correspond with the one or more bottom mirrors 604 and the one or more portions of the monolithic spacer 606. For example, a first portion of the multilevel etch mask 610-1 may be disposed over the first bottom mirror 604-1, and the first portion of the monolithic spacer 606-1, a second portion of the multilevel etch mask 610-2 may be disposed over the second bottom mirror 604-2 and the second portion of the monolithic spacer 606-2, and so on.

Figure 6D:
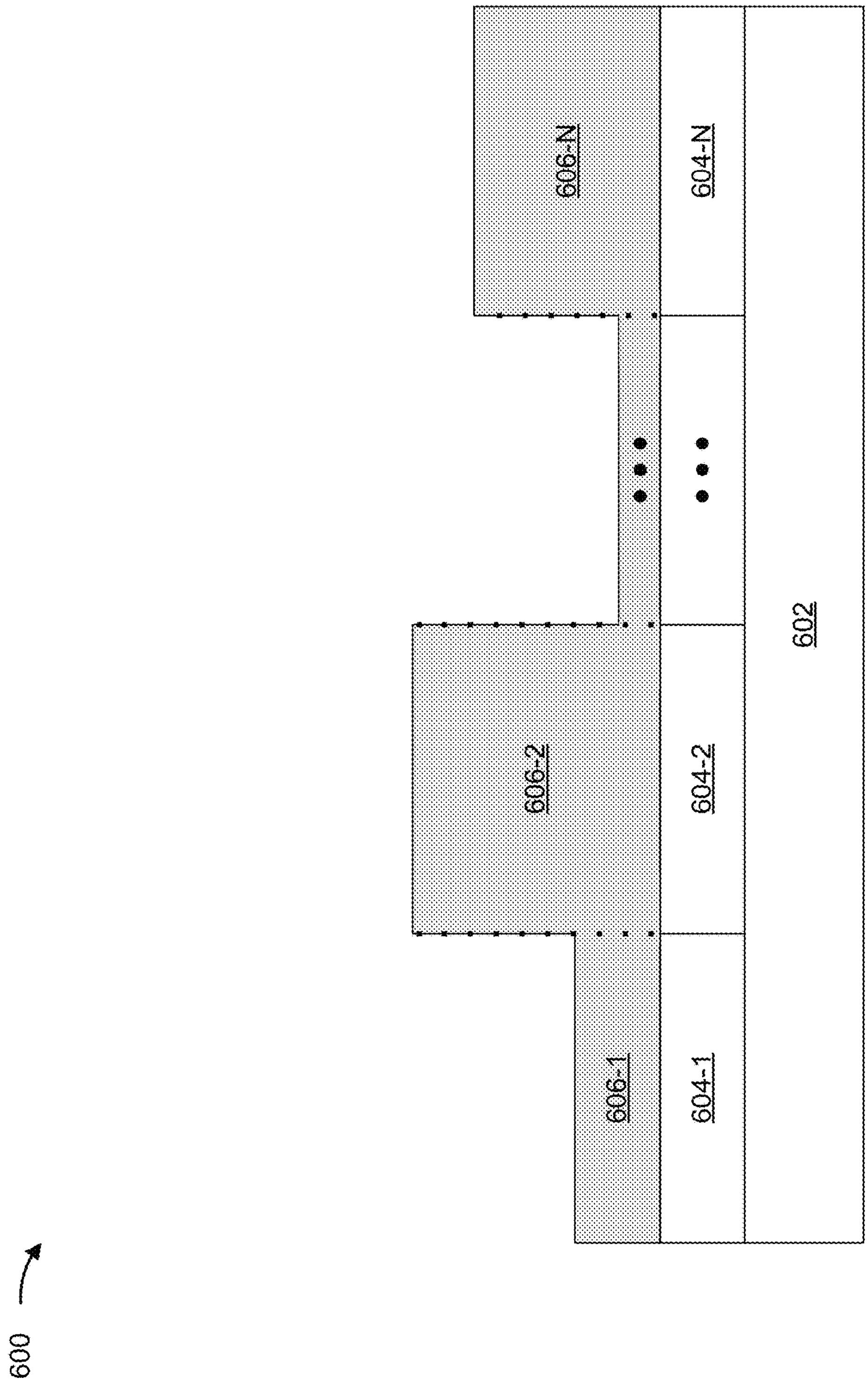

As shown in FIG. 6D, and by reference number 640, the formation process may include etching the multilevel etch mask 610 and/or the monolithic spacer 606 using an etching procedure. For example, the formation process may include using a single etching procedure, such as a single reactive ion etching procedure, to etch the multilevel etch mask 610 and/or the monolithic spacer 606. In some implementations, etching the multilevel etch mask 610 eliminates the multilevel etch mask 610 (e.g., none, or substantially none, of the multilevel etch mask 610 remains after completion of the etching procedure). Additionally, or alternatively, etching the monolithic spacer 606 may cause two or more portions of the monolithic spacer 606 to have different thicknesses. For example, etching the monolithic spacer 606 may cause the first portion of the monolithic spacer 606-1 that is disposed on the first bottom mirror 604-1 to have a first thickness and the second portion of the monolithic spacer 606-2 that is disposed on the second bottom mirror 604-2 to have a second thickness that is different than the first thickness. The respective thicknesses of the portions of the monolithic spacer 606 (e.g., after completion of the etching procedure) may be related to the respective thicknesses of corresponding portions of the multilevel etch mask 610 (e.g., prior to elimination of the multilevel etch mask 610 via the etching procedure). For example, a thickness of a particular portion of the monolithic spacer 606 (e.g., after completion of the etching procedure) may be a particular percentage of a thickness of a particular portion of the multilevel etch mask 610 that is disposed on the particular portion of the monolithic spacer 606 prior to the etching procedure.

Figure 6E:
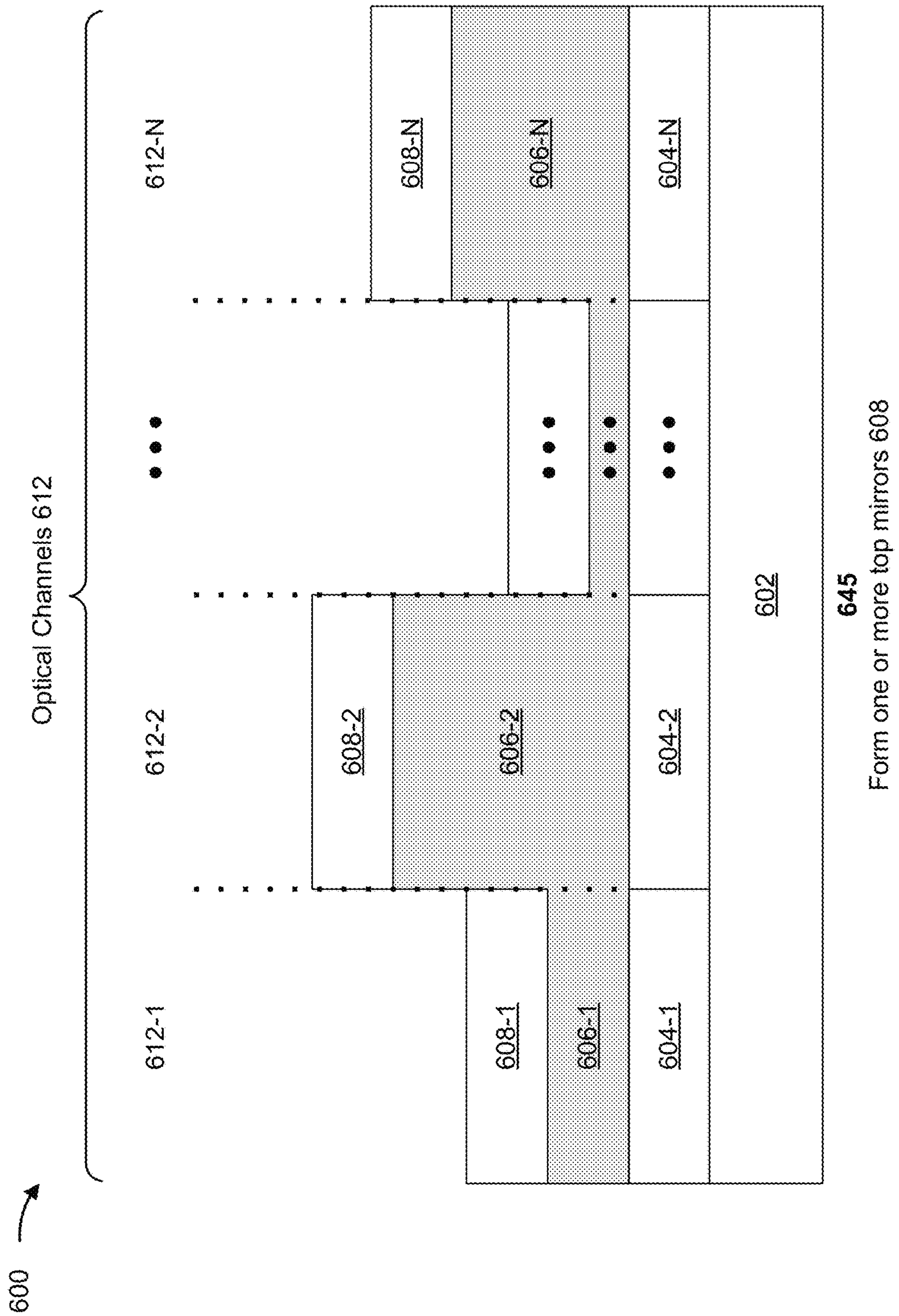

As shown in FIG. 6E, and by reference number 645/, the formation process may include forming the one or more top mirrors 608 on the monolithic spacer 606. For example, the formation process may include forming a first top mirror 608-1 on a first region of a surface of the monolithic spacer 606 (e.g., a top surface of the first portion of the monolithic spacer 606-1), a second top mirror 608-2 on a second region of the surface of the monolithic spacer 606 (e.g., a top surface of the second portion of the monolithic spacer 606-2), and so on.

In this way, the optical filter may formed with a plurality of optical channels 612 (e.g., that are the same as, or similar to, the plurality of optical channels 106, 206, 306, 406, and/or 506 described herein in relation to FIGS. 1-5). For example, a first optical channel 612-1 may comprise the first bottom mirror 604-1, the first portion of the monolithic spacer 606-1, and the first top mirror 608-1; a second optical channel 612-2 may comprise the second bottom mirror 604-2, the second portion of the monolithic spacer 606-2, and the second top mirror 608-2; and so on.

As indicated above, FIGS. 6A-6E are provided as an example. Other examples may differ from what is described with regard to FIGS. 6A-6E.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical filter, comprising:

a plurality of optical channels, wherein:

a first optical channel, of the plurality of optical channels, includes:

a first mirror and a second mirror that are configured to reflect one or more ranges of an electromagnetic spectrum, and a first portion of a monolithic spacer that is positioned between the first mirror and the second mirror;

a second optical channel, of the plurality of optical channels, includes:

a third mirror and a fourth mirror that are configured to reflect one or more ranges of the electromagnetic spectrum, and a second portion of the monolithic spacer that is positioned between the third mirror and the fourth mirror, wherein the first optical channel and the second optical channel are configured to be disposed over a single sensor element of a plurality of sensor elements; and a third optical channel, of the plurality of optical channels, includes a third portion of the monolithic spacer, wherein the first portion is adjacent to a first side of the second portion, wherein the third portion is adjacent to a second side of the second portion, and wherein the second portion is thicker than the first portion and the third portion.

2. The optical filter of claim 1, wherein a thickness of the first portion is different than a thickness of the third portion.

3. The optical filter of claim 1, wherein the first mirror and the third mirror are disposed over a same side of the monolithic spacer, wherein the first mirror and the third mirror are each configured to reflect a same range of the electromagnetic spectrum.

4. The optical filter of claim 1, wherein the first mirror and the third mirror are disposed over a same side of the monolithic spacer, wherein the first mirror and the third mirror are configured to reflect different ranges of the electromagnetic spectrum.

5. The optical filter of claim 1, wherein the electromagnetic spectrum comprises at least one of:

one or more portions of ultraviolet light;

one or more portions of visible light;

one or more portions of near-infrared light;

one or more portions of short-wave infrared light;

one or more portions of mid-wave infrared light; or one or more portions of long-wave infrared light.

6. The optical filter of claim 1, wherein:

the first mirror is configured to reflect a first range of the electromagnetic spectrum;

the second mirror is configured to reflect a second range of the electromagnetic spectrum;

the third mirror is configured to reflect a third range of the electromagnetic spectrum;

the fourth mirror is configured to reflect a fourth range of the electromagnetic spectrum; and the monolithic spacer is configured to transmit greater than a threshold percentage of light that has a wavelength that is within each of the first range of the electromagnetic spectrum, the second range of the electromagnetic spectrum, the third range of the electromagnetic spectrum, and the fourth range of the electromagnetic spectrum.

7. The optical filter of claim 1, wherein the monolithic spacer is formed using an etching procedure.

8. An optical sensor device, comprising:

an optical sensor comprising a plurality of sensor elements; and an optical filter comprising a plurality of optical channels, wherein:

the plurality of optical channels are respectively disposed over the plurality of sensor elements, a first optical channel, of the plurality of optical channels, includes:

a first mirror and a second mirror that are configured to reflect one or more ranges of an electromagnetic spectrum, and a first portion of a monolithic spacer that is positioned between the first mirror and the second mirror, wherein the first optical channel has a maximum width that is less than or equal to a maximum width of a particular sensor element, of the plurality of sensor elements, on which the particular optical channel is disposed;

a second optical channel, of the plurality of optical channels, includes a second portion of the monolithic spacer; and a third optical channel, of the plurality of optical channels, includes a third portion of the monolithic spacer, wherein the first portion is adjacent to a first side of the second portion, wherein the third portion is adjacent to a second side of the second portion, and wherein the second portion is thicker than the first portion and the third portion.

9. The optical sensor device of claim 8, wherein a thickness of the first portion is different than a thickness of the third portion.

10. The optical sensor device of claim 8, wherein a difference between a thickness of the first portion and a thickness of second portion is less than or equal to 10 nanometers (nm).

11. The optical sensor device of claim 8, wherein the first mirror and the second mirror are each configured to reflect a same portion of the electromagnetic spectrum.

12. The optical sensor device of claim 8, wherein:

the first mirror is configured to reflect a first range of the electromagnetic spectrum;

the second mirror is configured to reflect a second range of the electromagnetic spectrum; and the first portion is configured to transmit greater than a threshold percentage of light that has a wavelength that is within each of the first range of the electromagnetic spectrum and the second range of the electromagnetic spectrum.

13. The optical sensor device of claim 8, wherein the maximum width of the particular sensor element is less than or equal to 6 microns.

14. An optical filter, comprising:

a plurality of optical channels, wherein:

a first optical channel, of the plurality of optical channels, includes:

a first mirror and a second mirror that are configured to reflect a first range of an electromagnetic spectrum, and a first portion of a monolithic spacer that is positioned between the first mirror and the second mirror;

a second optical channel, of the plurality of optical channels, includes:

a third mirror and a fourth mirror that are configured to reflect a second range of the electromagnetic spectrum, and a second portion of the monolithic spacer that is positioned between the third mirror and the fourth mirror, wherein the first optical channel and the second optical channel each has a maximum width that is less than or equal to 6 microns, and wherein the first optical channel and the second optical channel are configured to be disposed over a single sensor element of a plurality of sensor elements; and a third optical channel, of the plurality of optical channels, includes a third portion of the monolithic spacer, wherein the first portion is adjacent to a first side of the second portion, wherein the third portion is adjacent to a second side of the second portion, and wherein the second portion is thinner than the first portion and the third portion.

15. The optical filter of claim 14, wherein a thickness of the first portion is different than a thickness of the third portion.

16. The optical filter of claim 14, wherein the third optical channel further comprises:

a fifth mirror and a sixth mirror that are configured to reflect one or more ranges of the electromagnetic spectrum, wherein the third portion is positioned between the fifth mirror and the sixth mirror.

17. The optical filter of claim 16, wherein a thickness of the third portion of the monolithic spacer is different than a thickness of the first portion of the monolithic spacer.

18. The optical filter of claim 1, wherein the first optical channel and the second optical channel each have a maximum width that is less than or equal to 6 microns.

19. The optical filter of claim 1, wherein the third optical channel includes a fifth mirror and a sixth mirror that are configured to reflect one or more ranges of the electromagnetic spectrum.

20. The optical filter of claim 19, wherein the third portion is positioned between the fifth mirror and the sixth mirror.

* * * * *